United States Patent [19]

Terajima

[11] Patent Number: 5,778,163
[45] Date of Patent: Jul. 7, 1998

[54] FACSIMILE APPARATUS AND CONTROL METHOD THEREFOR FOR AUTOMATICALLY SWITCHING BETWEEN A FACSIMILE MODE AND A PRINTER MODE

[75] Inventor: Hisao Terajima, Yokohama, Japan

[73] Assignee: Canon Kabushiki Kaisha, Tokyo, Japan

[21] Appl. No.: 789,872

[22] Filed: Jan. 28, 1997

Related U.S. Application Data

[62] Division of Ser. No. 301,433, Sep. 9, 1994, Pat. No. 5,621,540.

[30] Foreign Application Priority Data

Sep. 10, 1993 [JP] Japan ................. 5-226202

[51] Int. Cl.$^6$ ........................................ H04N 1/32
[52] U.S. Cl. .................... 395/113; 358/442; 358/444; 358/437
[58] Field of Search ................... 358/400, 404, 358/437, 444, 442, 468; 395/113, 114, 250, 275, 325, 400, 425; 379/100, 100.01, 100.15; 399/83, 85; H04N 1/00, 1/32

[56] References Cited

U.S. PATENT DOCUMENTS

| | | | |
|---|---|---|---|
| 4,907,094 | 3/1990 | Mishima et al. | 358/404 |
| 4,991,200 | 2/1991 | Lin | 379/100 |
| 5,072,303 | 12/1991 | Silverberg | 358/296 |
| 5,177,620 | 1/1993 | Fukushima et al. | 358/404 |
| 5,200,830 | 4/1993 | Imaizumi et al. | 358/468 |
| 5,311,327 | 5/1994 | Fukushima et al. | 358/444 |
| 5,459,579 | 10/1995 | Hu et al. | 358/444 |
| 5,570,201 | 10/1996 | Yokota | 358/468 |
| 5,608,546 | 3/1997 | Nakamura et al. | 358/468 |
| 5,621,540 | 4/1997 | Terajima | 358/468 |

*Primary Examiner*—Kim Yen Vu
*Attorney, Agent, or Firm*—Fitzpatrick, Cella, Harper & Scinto

[57] ABSTRACT

A facsimile apparatus having a printer which can operate independently. If it is designated to use the printer as a printer, whether or not the memory of the facsimile controller has a predetermined amount or more empty area. If the memory has a sufficient amount of empty area, the memory is used as a print buffer for temporarily storing print data from a computer connected to the printer. On the other hand, if the memory does not have the predetermined amount or more empty area, the printer is directly connected to the computer, and the printer is used as a printer.

12 Claims, 5 Drawing Sheets

FACSIMILE APPARATUS AND CONTROL METHOD THEREFOR FOR AUTOMATICALLY SWITCHING BETWEEN A FACSIMILE MODE AND A PRINTER MODE

This application is a division of application Ser. No. 08/301,433 filed Sep. 9, 1994 now U.S. Pat. No. 5,621,540.

BACKGROUND OF THE INVENTION

Present invention relates to a facsimile apparatus which can be used as a printer and a printing control method for the apparatus.

Small-sized and low-price facsimile apparatuses, comprising an ink-jet printer as a recorder, capable of printing on ordinary paper have been developed. The printer unit of these apparatuses may be directly connected to a computer and used as an independent printer. In this case, the printer unit does not operate under the control of the controller of the facsimile main body. It comprises a CPU and a RAM as a printer controller so as to directly receive data from the computer and independently perform printing.

Accordingly, when this facsimile apparatus operates as an independent printer, the memory for the facsimile controller is not used at all. That is, the hardware resource of the facsimile apparatus cannot be effectively utilized.

SUMMARY OF THE INVENTION

The present invention has been made in consideration of the above situation, and has as its object to provide a facsimile apparatus and a printing control method which effectively utilizes a facsimile memory and performs printing.

Another object of the present invention is to provide a facsimile apparatus and printing control method which uses a facsimile controller memory as a print buffer when the apparatus functions as a printer, thus effectively utilizes the system resource for high-speed printing.

Further object of the present invention is to provide a facsimile apparatus and printing control method which, in a printer mode where the printer unit is used as an independent printer, if a facsimile signal is received, automatically switches from the printer mode to a facsimile mode for facsimile reception.

Still another object of the present invention is to provide a facsimile apparatus and printing control method which enables facsimile/printer mode instruction using a few keys.

Further object of the present invention is to provide a facsimile apparatus used as both a facsimile apparatus and an independent printer, and a printing control method for the apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT(S)

Preferred embodiments of the present invention will be described in detail in accordance with the accompanying drawings.

Figure 1:
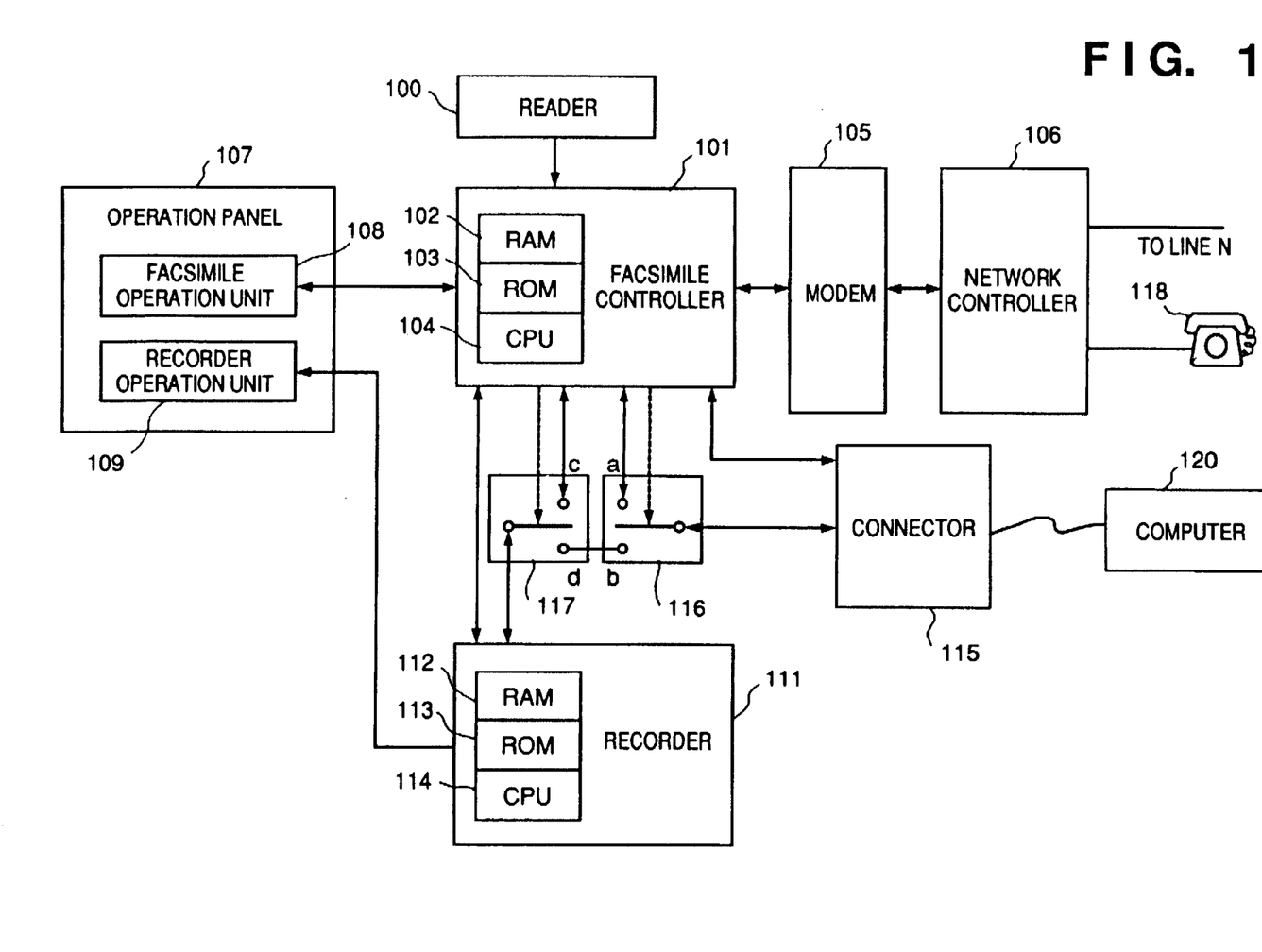
FIG. 1 is a block diagram showing the configuration of a facsimile apparatus according to an embodiment of the present invention.

FIG. 1 is a block diagram showing the configuration of a facsimile apparatus according to an embodiment of the present invention. In FIG. 1, reference numeral 101 denotes a facsimile controller for controlling the overall facsimile apparatus. The controller 101 comprises a microprocessor (CPU) 104, a ROM 103 in which various data such as control programs for the CPU 104 and font data are stored, a RAM 102, used as a work area for the CPU 104, for temporarily storing various data and the like, and controls image data input/output and the communication processing.

A reader 100 for reading an original image serves as an image data input unit, and a recorder 111 for performing printing based on image data serves as an image data output unit. That is, the reader 100 reads an original conveyed by an original conveying mechanism by a CCD (charge-coupled device) sensor. The read image data is transferred to the recorder 111 which is, e.g. an ink-jet printer, for printing (copying operation). Facsimile image data received via a network controller (NCU) 106 and a modem 105 is decoded and converted into binary image data, then transferred to the recorder 111 which performs printing, based on the data, on a recording medium such as a recording sheet. The modem 105 and the NCU 106 controls connection between a communication line N such as a telephone line and data input/output from or to the line N. The NCU 106 is connected to a telephone 118 for communication and manual control operation.

In this example, the recorder 111 has an ink-jet head, a recording-sheet conveying mechanism and a printer controller and the like. The recorder 111 comprises a CPU 114, a ROM 113 in which various information, such as control programs for the CPU 114 and font data are stored, and a RAM 112 used as a work area for the CPU 114 and further used as a command buffer and a print buffer.

Numeral 116 and 117 denote switches under the control of the facsimile controller 101. That is, when data inputted from a computer 120 via a connector 115 is directly printed, the switch 116 is connected to the b-terminal and the switch 117 is connected to the d-terminal. When the RAM 102 of the facsimile controller 101 is used as a print buffer for storing print data transferred from the computer 120, the switch 116 is connected to the a-terminal and the switch 117 is connected to the c-terminal. Further, when the apparatus functions as a facsimile apparatus, the switch 116 is connected to the a-terminal, and the switch 117 is connected to the c-terminal. In this status, image data received as a facsimile signal and decoded is transferred from the controller 101 via the switch 117 to the recorder 111 for printing. At this time, the controller 101 outputs a busy signal indicative of busy-status of the recorder 111 to the computer 120. Accordingly, if the busy signal is ON, the computer 120 connected via the connector 115 determines that the facsimile apparatus cannot be used as a printer.

In the printer mode where the recorder 111 is used as a printer, if the RAM 102 of the facsimile controller 101 has an empty area and the RAM 102 can be used as a print buffer, the switch 116 is connected to the a-terminal and the switch 117 is connected to the c-terminal. Print data transferred from the computer 120 is buffered in the RAN 102 by the controller 101 via the switch 116, then transferred to the recorder 111 via the switch 117 which performs printing based on the print data. On the other hand, if the RAM 102 of the facsimile controller 101 has no empty area and the RAM 102 cannot be used as a print buffer, the switch 117 is connected to the d-terminal and the switch 116 is connected to the b-terminal. Print data from the computer 120 is directly transferred to the recorder 111, via the switches 116 and 117, which performs printing based on the received print data.

Numeral 107 denotes an operation panel which, as will be described later with reference to FIG. 2, includes a facsimile operation unit 108 and a recorder operation unit 109. The facsimile operation unit 108 has a ten-key pad for inputting telephone numbers to specify transmission designations, abbreviated-dialing number keys, various function keys, a mode selection key for switching over the facsimile mode and the printer mode, and a display 200 (FIG. 2) such as an LCD for displaying telephone numbers, time and the like. The recorder operation unit 109 has an on-line/off-line switching key, a line-feed (paper feed) key, a form feed key, a print mode key, and operation keys for setting various print modes, and the display 200 for displaying a printing mode or error status, some messages and the like.

Figure 2:
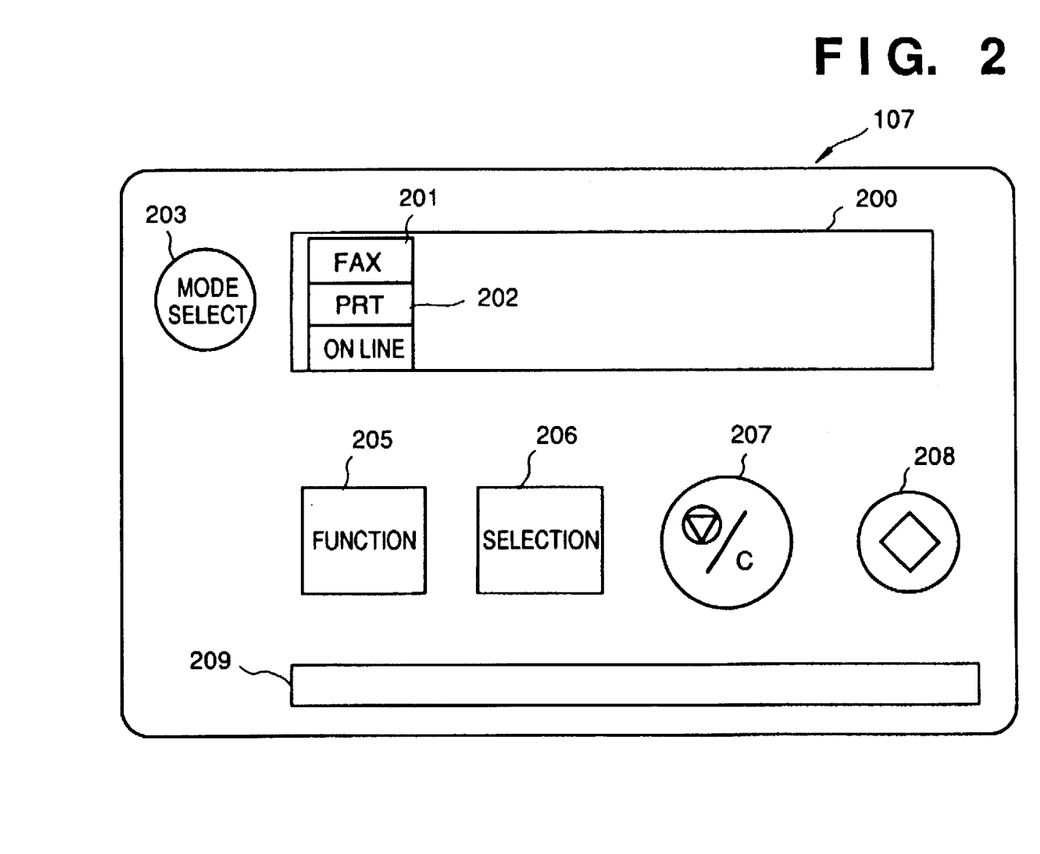
FIG. 2 illustrates an operation panel of the facsimile apparatus of the embodiment.

FIG. 2 shows the arrangement of the keys and the construction of the operation panel 107 of the facsimile apparatus of the present embodiment. In FIG. 2, numeral 201 denotes an indicator for indicating the facsimile mode; 202, an indicator for indicating the printer mode; 203, a mode selection key; 205, a function key for setting various functions; and 206, a selection key for setting various modes. The indicator 201 is turned on when the facsimile mode is selected. The indicator 202 is turned on when the printer mode is selected. The mode selection key 203 is used for switching over the facsimile mode and the printer mode. The mode changes alternatively at each pressing of the mode selection key 203. In the facsimile mode, the function key 205 is used for setting functions such as broadcasting, direct transmission and confidential transmission. The set function is displayed on the display 200. In the printer mode, the function key 205 is used as an on-line/off-line mode selection key. The on-line mode ("ON LINE" on the display 200 is displayed) is for receiving data from the computer 120 and performing printing based on the received data. In the facsimile mode, the selection key 206 is used for setting transmission modes such as fine mode and normal mode, and in the printer mode, the selection key 206 is used for setting printing modes such as high-quality printing, normal printing, high-speed printing, etc. In the facsimile mode and the printer mode, the selected modes are displayed on the display 200.

Numeral 207 denotes a stop/clear key; and 208, a start key. In the facsimile mode, the stop/clear key 207 is used to stop transmission or clear an error, and the start key 208 is used for instructing the start of transmission or instructing the star of copying operation. In the printer mode, the start key 208 is used as a paper feed key (LF) or a form feed key (FF). Note that the operation panel has a function display area 209 which, in accordance with the respective modes, displays the corresponding functions of those keys 205 to 208. In this manner, the keys 205 to 208 function as a part of the FAX operation unit 108 or the recorder operation unit 109.

Figure 4:
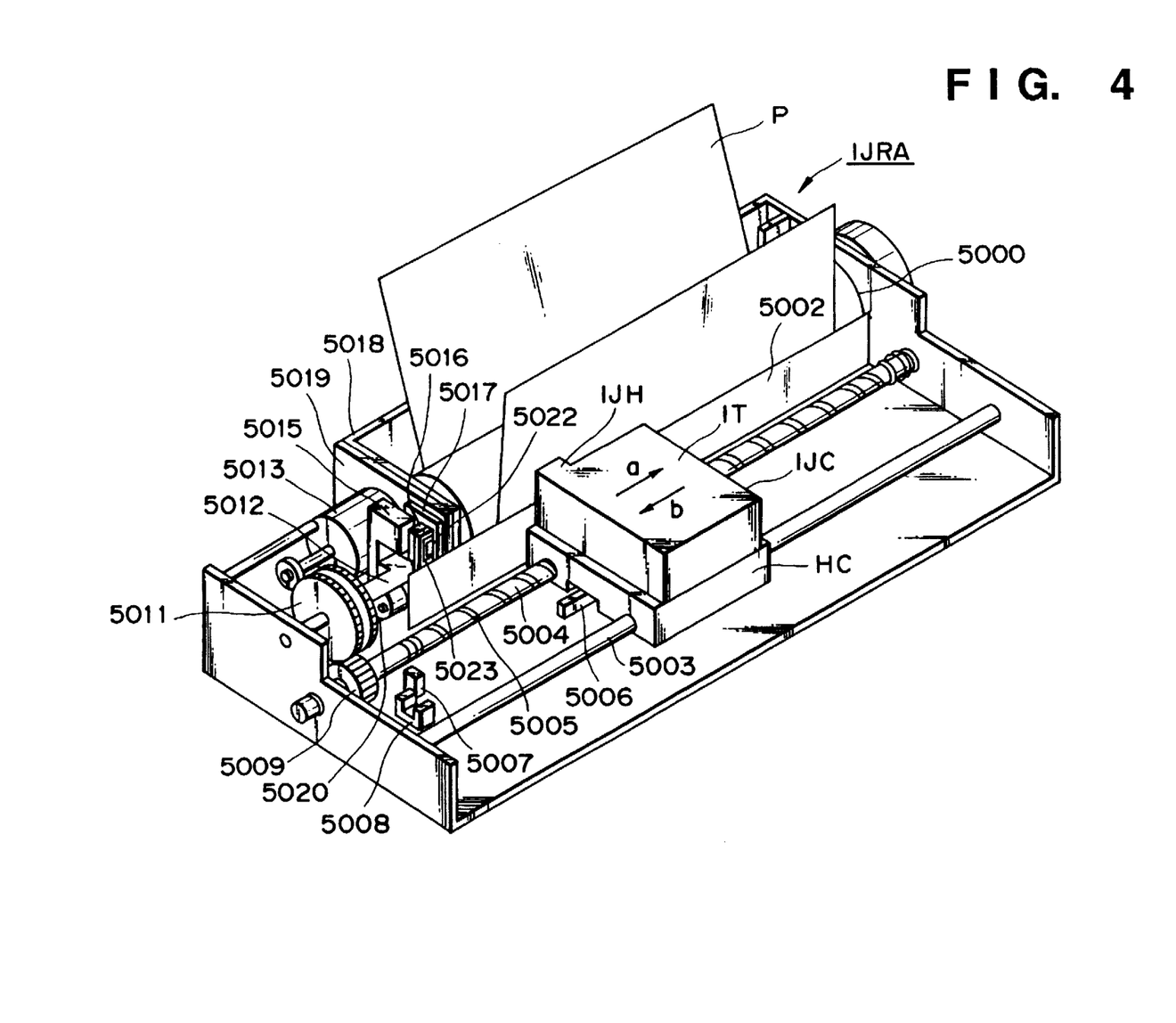
FIG. 4 is a perspective view showing a recorder of the embodiment.

FIG. 4 shows an example of the recorder 111.

In FIG. 4, a carriage HC is engaged with a spiral groove 5004 of a lead screw 5005 which rotates via driving force transmission gears 5011 and 5009 interlocking with forward/reverse rotation of a driving motor 5013. The carriage has a pin (not shown) and it is reciprocally moved in directions represented by arrows a and b. The carriage HC has ink-jet cartridge IJC. In this embodiment, the ink-jet cartridge IJC integrally comprises a print head IJH and an ink tank IT. The print head IJH discharges ink droplets from discharge orifices by changing ink-state using thermal energy. A paper bail 5002 presses a recording sheet against a platen 5000 along the moving direction of the carriage. Photocouplers 5007 and 5008 are home position detecting members for confirming the existence of lever 5006 of the carriage in this area and changing over the rotational direction of motor 5013. A support member 5016 supports a cap member 5022 for capping the front surface of the printing head. A suction member 5015 performs suction-restoration of the printing head the inside of the cap member 5022 via a cap inner opening 5023. Member 5019 allows a cleaning blade 5017 to move in a back-and-forth direction. A main body support plate 5018 supports the member 5019 and the cleaning blade 5017. It is apparent that any well-known cleaning blade is applicable to the printer of the embodiments. Numeral 5021 denotes a lever for starting the sucking operation of the suction-restoration. The lever 5021 moves along the movement of a cam 5020 engaged with the carriage. A well-known transmission mechanism such as change-over of a clutch controls a driving force from the driving motor.

When the carriage arrives at the home position, a desired processing among capping, cleaning and suction-restoration is executed at its corresponding position by the lead screw 5005. The timing of any of these processing is not limited to the printer of the embodiments.

Figure 3:
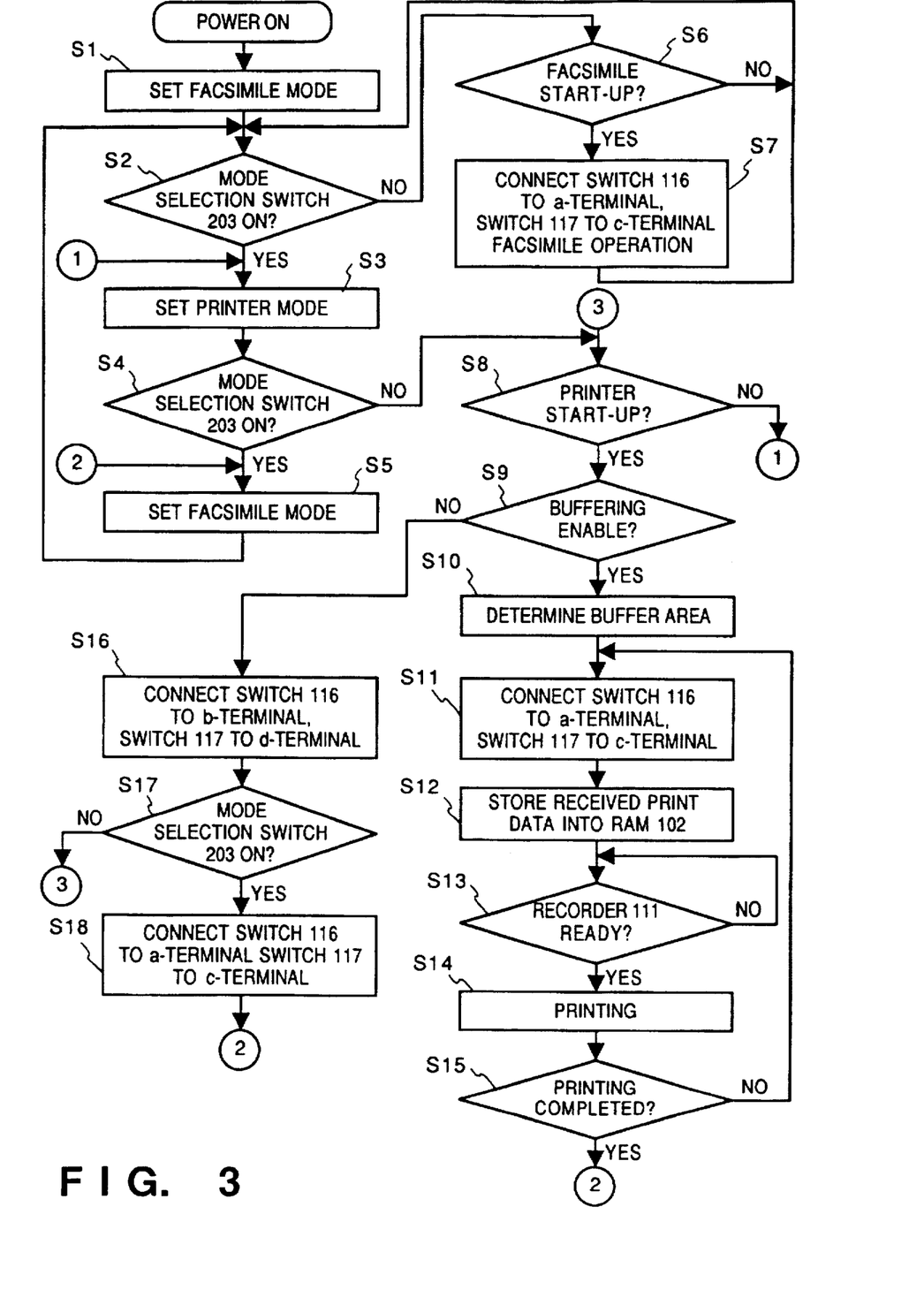
FIG. 3 is a flowchart showing the processing by a controller of the facsimile apparatus of the embodiment.

FIG. 3 shows the control operation by the FAX controller 101 of the facsimile apparatus of the present embodiment. The control program for performing this processing is stored in the ROM 103 of the FAX controller 101.

This facsimile apparatus is set to the facsimile mode when the power is turned on. More specifically, the CPU 104 issues an instruction to set a flag indicative of the facsimile mode in the RAM 102, and the FAX indicator 201 of the display 200 is turned on. The keys 205 to 208 on the operation panel 107 are set for the facsimile mode, and the display area 209 displays the respective functions corresponding to the keys in the facsimile mode. In step S2, the status of the mode selection key 203 on the operation panel 107, i.e., whether or not the mode selection key 203 has been pressed is monitored, and if the key 203 has been pressed, the process proceeds to step S3 where the facsimile mode is changed to the printer mode. This setting is made by the instruction from the CPU 104 to turn the FAX indicator 201 off and turn the printer indicator 202 on. The keys 205 to 208 for the both facsimile and printer modes are set for the printer mode, and the display area 209 displays the respective functions corresponding to the keys in the printer mode. At the same time, the aforementioned flag in the RAM 102 is set from the facsimile mode to the printer mode. Next, in step S4, whether or not the mode selection key 203 has been pressed is examined. If YES, the process proceeds to step S5 where the facsimile mode is set similarly to step S1.

If NO in step S2, the process proceeds to step S6 where whether or not facsimile starting signals including a CI signal, an original detection signal, a hook-up signal and a signal indicative of the pressing of the start key 208 have been received is monitored. If YES, the process proceeds to step S7 where facsimile operation is started. At this time, the switch 116 is connected to the a-terminal and the switch 117 is connected to the c-terminal, and a busy signal is outputted via the switch 116 and the connector 115 to the computer 120. As the facsimile transmission/reception or copying operation is completed, the process returns to step S2.

On the other hand, if it is determined in step S4 that the mode selection key 203 has not been pressed, the process proceeds to step S8 where whether or not a printer starting signal has been inputted via the connector 115 is monitored. The printer starting signal is, e.g., an initial signal of a centronics interface or a start bit of the RS-232 interface. If the printer starting signal has not been inputted, the process returns to step S3.

In step S8, if it is determined that the printer starting signal has been inputted from the computer 120, the process proceeds to step S9 where whether or not the RAM 102 has a predetermined amount or more empty area is examined. If YES, as the RAM 102 can be used as a print buffer, the process proceeds to step S10. On the other hand, if a predetermined amount or more image data is already stored in the RAM 102 due to reserved transmission or memory reception (temporarily storing received facsimile data) and there is no empty area equal to or more than the predetermined amount, the RAM 102 cannot be used as a print buffer. In this case, the process proceeds to step S16.

In step S10, the availability of the RAM 102 as a FIFO buffer is determined based on its empty area, and end address of the print buffer is determined and is stored into the work area of the RAM 102. In step S11, the switch 116 is connected to the a-terminal, and the switch 117 is connected to the c-terminal. In step S12, the RAM 102 is used as the print buffer. That is, print data received via the connector 115 is sequentially stored into the RAM 102. At this time, if the amount of the received data exceeds the memory area (end address) determined in step S10, a busy signal is outputted via the connector 115 to the computer 120.

At the same time, in step S13, whether or not the recorder 111 is ready is determined. If YES, the process proceeds to step S14 where printing is performed. Then in step S15, it is determined whether or not printing based on all the print data stored in the RAM 102 or based on print data from the computer 120 has been completed. If NO, the process returns to step S12 where the received print data is stored in the RAM 102. If no data has been stored into the RAM 102 for a predetermined period, it is determined that printing has been completed, and the process proceeds to step S5 to repeat the above operation.

On the other hand, if the RAM 102 does not have sufficient empty area and it cannot be used as a print buffer in step S9, the process proceeds to step S16, where the switch 116 is connected to the b-terminal and the switch 117 is connected to the d-terminal. Then data transfer for printing is performed between the computer 120 and the recorder 111 via the connector 115. In step S17, whether or not the mode selection key 203 has been pressed is examined. If YES, the process proceeds to step S18 where the switch 116 is connected to the a-terminal and the switch 117 is connected to the c-terminal, then the process returns to step S5 to clear the printer mode and set the facsimile mode.

Preferably, if the recorder 111 is performing printing operation, the input from the switch 203 is invalidated until the completion of the printing.

Though not shown in the flowchart in FIG. 3, even when the printer mode is selected, if the RAM 102 has sufficient empty area and a facsimile signal has been received, the current mode may be automatically changed to the facsimile mode.

Figure 5:
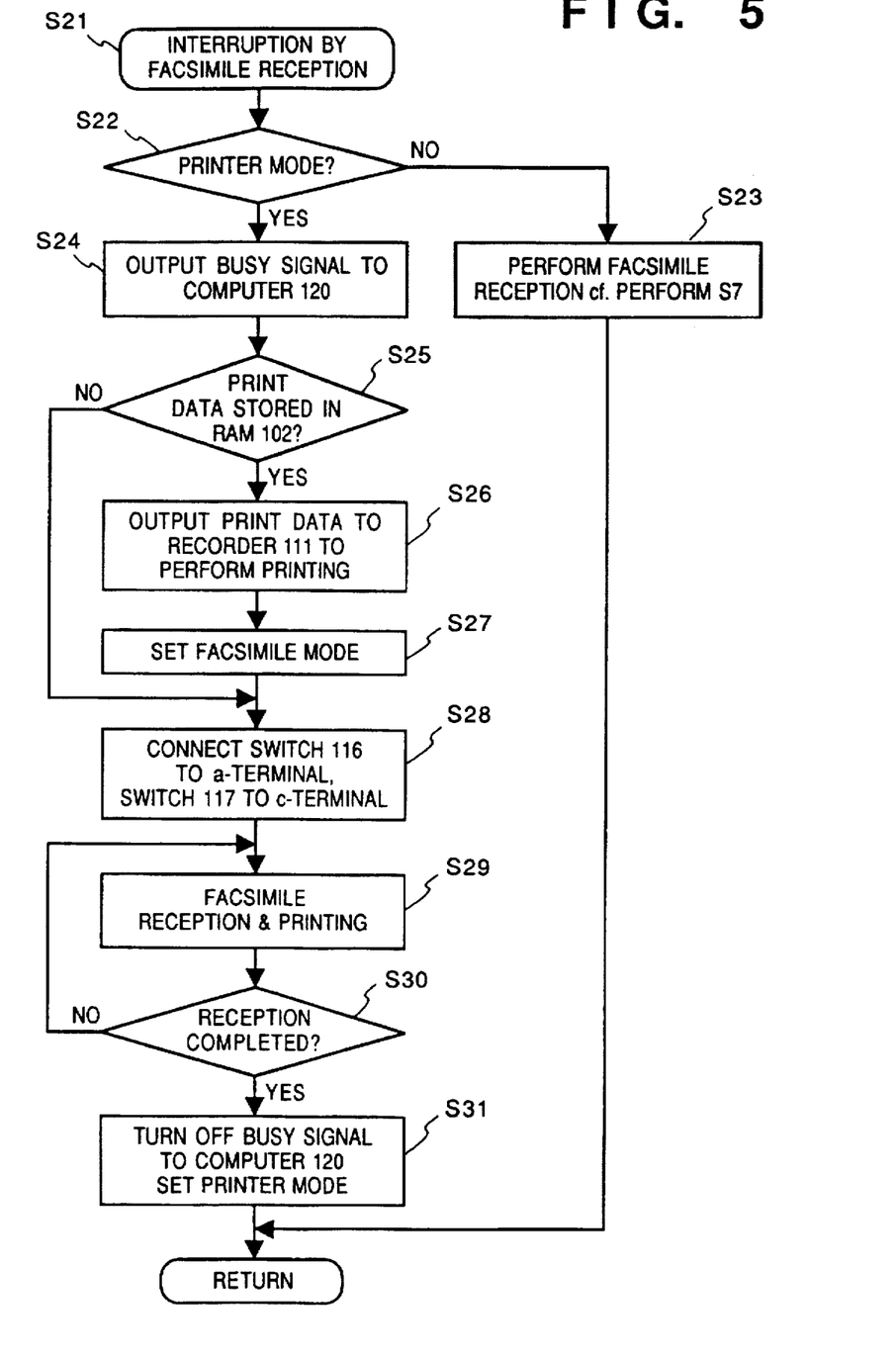
FIG. 5 is a flowchart showing the operation of the facsimile apparatus of the embodiment when it detects reception of a facsimile signal.

FIG. 5 is a flowchart showing the processing when the facsimile apparatus of this embodiment receives a facsimile signal. The control program for performing this processing is stored in the ROM 103.

When a facsimile signal is received through the line N, the reception of facsimile signal is transmitted via the network controller 106 and the modem 105. Then an interruption signal is inputted into the CPU 104 to start this reception processing. In step S22, whether or not the current mode is the printer mode is examined. If NO, i.e., the facsimile mode has been selected, the process proceeds to step S23 to perform facsimile reception similarly to step S7 in FIG. 3.

On the other hand, if YES in step S22, i.e., the printer mode is selected, the process proceeds to step S24 where a busy signal is outputted to the computer 120 to set the computer 120 into stand-by status. Preferably, this busy signal is outputted at, e.g., each page break point. Next, in step S25, whether or not print data from the computer 120 is stored in the RAM 102 is determined, i.e., whether or not a sufficient empty area exists in the RAM 102. If YES, the process proceeds to step S26 where the print data is read out of the RAM 102 and outputted to the recorder 111, to perform printing based on the print data. Then in step S27, the facsimile mode is set, since the used print data is deleted and an empty area for storing the received facsimile data can be made in the RAM 102.

In step S28, similarly to step S7 in FIG. 3, the switch 116 is connected to the a-terminal, and the switch 117 is connected to the c-terminal. Next, in step S29, facsimile signal reception or printing of decoded data is performed. Steps S29 and S30 are repeated till facsimile reception is completed in step S30. Upon completion of the facsimile reception, the busy signal to the computer 120 is turned off, and the current mode is changed from the facsimile mode to the printer mode.

In this manner, even in the printer mode, upon reception of facsimile signal, the current mode is quickly changed to facsimile reception.

In this embodiment, the determination of the completion of printing is made if no data has been stored into the RAM for a predetermined period. However, this determination may be made in accordance with key-input from the mode selection key 203.

Further, even when printing is being performed where the RAM 102 is used as a print buffer, if a facsimile signal is received, a busy signal may be outputted to the computer 120 to set the computer 120 into stand-by status. Then all the print data in the RAM 120 may be outputted to the recorder 111 to perform printing, thereafter, facsimile reception in accordance with the received facsimile signal may be performed.

As described above, according to the present embodiment, in the printer mode, the memory (RAM 102) of the facsimile controller 101 can be used as a print buffer, which enables high-speed reception of print data from the computer 120, further enables effective utilization of hardware resource of the facsimile apparatus.

Even when the memory of the facsimile controller 101 has insufficient area and it cannot be used as a print buffer, printing in the printer mode can be performed without using the memory (RAM) of the facsimile controller 101 as a print buffer.

The present invention can be applied to a system constituted by a plurality of devices, or to an apparatus comprising a single device. Furthermore, the invention is applicable also to a case where the object of the invention is attained by supplying a program to a system or apparatus.

In the above embodiment, the recorder 111 is a printing apparatus of, among the ink-jet printing methods, especially a type having an arrangement that heat energy is utilized to form a flying fluid droplet so as to perform the recording operation. As for the typical structure and the principle, it is preferable that the basic structure disclosed in, for example, U.S. Pat. No. 4,723,129 or 4,740,796 be employed. The aforesaid method can be adapted to both so-called on-demand type apparatus and continuous type apparatus. In particular, a satisfactory effect can be obtained when the on-demand type apparatus is employed because of the structure is arranged in such a manner that one or more drive signals, which rapidly raise the temperature of an electricity-to-heat converter disposed to face a sheet or a fluid passage which holds the fluid (ink) to a level higher than levels at which nuclear boiling takes place are applied to the electricity-to-heat converter so as to generate heat energy in the electricity-to-heat converter and to cause the heat effecting surface of the printing head to take place film boiling so that bubbles can be formed in the fluid (ink) to correspond to the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred effect to be obtained because the fluid (ink) can be discharged while revealing excellent responsiveness.

It is preferable that a pulse drive signal disclosed in U.S. Pat. No. 4,463,359 or 4,345,262 be employed. If conditions disclosed in U.S. Pat. No. 4,313,124 which is an invention relating to the temperature rising ratio at the heat effecting surface are employed, a satisfactory recording result can be obtained.

As an alternative to the structure (linear fluid passage or perpendicular fluid passage) of the printing head disclosed in each of the aforesaid inventions and having an arrangement that discharge ports, fluid passages and electricity-to-heat converters are combined, a structure having an arrangement where the heat effecting surface is disposed in a bent region and disclosed in U.S. Pat. No. 4,558,333 or 4,459,600 may be employed.

In addition, the following structures may be employed: a structure having an arrangement that a common slit is formed to serve as a discharge section of a plurality of electricity-to-heat converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section.

A full-line type printing head having a length capable of covering the width of the widest recording medium which can be recorded by the recording apparatus, a structure having the width by combining a plurality of printing heads or a structure having a sole integrated printing head and disclosed in any of the aforesaid specifications may be employed.

A chip type printing head which can be electrically connected to the body of the apparatus or to which ink can be supplied from the body of the apparatus when it is fastened to the body of the apparatus may be employed. Furthermore, a cartridge printing head having an ink tank integrally formed with the printing head may be employed.

It is preferred to additionally employ the printing head restoring means and the auxiliary means provided as the component of the present invention because the effect of the present invention can be further stabled. Specifically, it is preferable to employ a printing head capping means, a cleaning means, a pressurizing or suction means, an electricity-to-heat converter, an another heating element or a sub-heating means constituted by combining them and a sub-emitting mode in which an emitting is performed independently from the printing emitting in order to stably perform the printing operation.

Although a fluid ink is employed in each of the aforesaid embodiments of the present invention, ink which solidifies at the room temperature or lower and as well as softened at the room temperature, or ink in the form of a fluid at the room temperature or ink which is formed into a fluid when the recording signal is supplied may be employed because the aforesaid ink jet recording method is ordinarily arranged in such a manner that the temperature of ink is controlled in a range from 30° C. or higher and 70° C. or lower so as to make the viscosity of the ink to be included in a stable discharge range.

Furthermore, ink of the following types can be adapted to the present invention: ink which liquefies when heat energy is supplied in response to the recording signal so as to be discharged in the form of fluid ink, the aforesaid ink being exemplified by ink, the temperature rise due to supply of the heat energy is positively prevented by utilizing the temperature rise as energy of state change from the solid state to the liquid state; and ink which solidifies when it is allowed to stand to prevent ink evaporation. Furthermore, ink which first liquefies when supplied with heat energy may be adapted to the present invention. In the aforesaid case, the ink may be of a type which is held as fluid or solid material in a recess of a porous sheet or a through hole at a position facing the electricity-to-heat converter as disclosed in Japanese Patent Laid-Open No. 54-56847 or Japanese Patent Laid-Open No. 60-71260. It is the most preferred way for the ink to be adapted to the aforesaid film boiling method.

The recorder according to the present invention may be in the form of a copying apparatus combined with a reader or the like, or a facsimile apparatus having a transmission/receiving function as well as the integrated or independent apparatus serving as image output terminative equipment of information processing apparatus such as the aforesaid word processor or the computer.

Furthermore, the recording method is applicable to an ink-jet printing method utilizing a piezoelectric device as well as the ink-jet printing method utilizing thermal energy.

The present invention is not limited to the above embodiments and various changes and modifications can be made within the spirit and scope of the present invention. Therefore, to appraise the public of the scope of the present invention, the following claims are made.

What is claimed is:

1. A control method for a facsimile apparatus capable of selectively operating in either a first mode, which prints according to a received facsimile signal, and a second mode, which prints according to an image signal from an external device, the facsimile apparatus comprising memory means for storing data corresponding to the received facsimile signal, and the memory means also being used for storing data corresponding to the image signal from the external device, said method comprising the steps of:

when a facsimile signal is received while the facsimile apparatus is operating in the second mode, causing the external device to enter a waiting state;

with the external apparatus in the waiting state, determining whether or not the memory means stores data corresponding to the image signal from the external device not yet printed; and setting the first mode after the not yet printed data has been output from the memory means, when it is determined in said determining step that the not yet printed data is stored in the memory means.

2. The method according to claim 1, further comprising the step of releasing the waiting state of the external device and setting the second mode after completion of operating in the first mode.

3. The method according to claim 1, wherein the external device is a computer device.

4. The method according to claim 3, wherein the facsimile apparatus sets the computer device to be in the waiting state by supplying a busy signal to the computer device.

5. The method according to claim 1, wherein the facsimile outputs data from the memory means to an ink jet recording unit to print an image on a recording medium.

6. The method according to claim 5, wherein the ink jet recording unit discharges ink by causing a change of ink state by using thermal energy.

7. A facsimile apparatus capable of selectively operating in either a first mode, which prints according to a received facsimile signal, and a second mode, which prints according to an image signal from an external device, comprising:

setting means for setting the first mode or the second mode;

memory means for storing data corresponding to the received facsimile signal, said memory means also being used for storing data corresponding to the image signal from the external device;

signal supply means for, in response to receipt of a facsimile signal while said apparatus is operating in the second mode, supplying a predetermined signal to the external device so as to set the external device in a waiting state;

determining means for determining, while the external apparatus is in the waiting state, whether or not said memory means stores data corresponding to the image signal from the external device not yet printed; and output control means for outputting the not yet printed data from said memory means in a case where it is determined by said determining means that the not yet printed data is stored in said memory means, wherein said setting means sets the first mode after completion of outputting the not yet printed data.

8. The apparatus according to claim 7, further comprising key input means, wherein said setting means sets the first mode or the second mode in accordance with a key input from said key input means.

9. The apparatus according to claim 7, wherein said setting means sets the second mode after completion of operating in the first mode.

10. The apparatus according to claim 7, wherein said external device is a computer device, and said signal supply means stops outputting the predetermined signal after completion of operation in the first mode.

11. The apparatus according to claim 7, further comprising ink jet recording means for recording on a recording medium by discharging ink according to data output from said memory means.

12. The apparatus according to claim 11, wherein said ink jet recording means discharges ink by causing a change of ink state by using thermal energy.

* * * * *

UNITED STATES PATENT AND TRADEMARK OFFICE
CERTIFICATE OF CORRECTION

PATENT NO. : 5,778,163

DATED : July 7, 1998

INVENTOR(S) : HISAO TERAJIMA

It is certified that error appears in the above-identified patent and that said Letters Patent is hereby corrected as shown below:

<u>COLUMN 1</u>

Line 38, "utilizes" should read --utilizing--;

<u>COLUMN 3</u>

Line 64, "star" should read --start--;

UNITED STATES PATENT AND TRADEMARK OFFICE
CERTIFICATE OF CORRECTION

PATENT NO. : 5,778,163

DATED : July 3, 1998

INVENTOR(S): HISAO TERAJIMA

It is certified that error appears in the above-identified patent and that said Letters Patent is hereby corrected as shown below:

<u>COLUMN 10</u>

```
    Line 7, "state:" should read --state;--.
```

Signed and Sealed this

Twenty-fourth Day of August, 1999

*Attest:*

Q. TODD DICKINSON

*Attesting Officer*      *Acting Commissioner of Patents and Trademarks*